United States Patent
Nakahara et al.

(10) Patent No.: US 7,558,854 B2
(45) Date of Patent: Jul. 7, 2009

(54) ACCESS RELAYING APPARATUS

(75) Inventors: Masahiko Nakahara, Machida (JP); Fumio Noda, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 532 days.

(21) Appl. No.: 10/383,243

(22) Filed: Mar. 7, 2003

(65) Prior Publication Data

US 2004/0111492 A1    Jun. 10, 2004

(30) Foreign Application Priority Data

Dec. 10, 2002    (JP)    ............................. 2002-357412

(51) Int. Cl.
*G06F 15/173*    (2006.01)
(52) U.S. Cl. ...................... 709/226; 709/229
(58) Field of Classification Search ................ 709/203, 709/225, 226, 223, 213–216, 229, 246, 249
See application file for complete search history.

(56) References Cited

U.S. PATENT DOCUMENTS

| | | | | |
|---|---|---|---|---|
| 6,018,619 A * | 1/2000 | Allard et al. | ................ | 709/224 |
| 6,070,191 A * | 5/2000 | Narendran et al. | .......... | 709/226 |
| 6,134,588 A * | 10/2000 | Guenthner et al. | .......... | 709/226 |
| 6,314,465 B1 * | 11/2001 | Paul et al. | .................... | 709/226 |
| 6,317,787 B1 | 11/2001 | Boyd et al. | | |
| 6,377,975 B1 * | 4/2002 | Florman | ..................... | 709/203 |

(Continued)

FOREIGN PATENT DOCUMENTS

| | | |
|---|---|---|
| EP | 0 883 271 A2 | 12/1998 |
| JP | 11-025059 | 1/1999 |
| JP | 2001-519067 | 10/2001 |
| JP | 2002-082926 | 3/2002 |
| WO | WO 98-45978 | 10/1998 |

OTHER PUBLICATIONS

Norifume Nishikawa, et al., "Memory-Based Architecture for Distributed WWW Caching Proxy", Computer Networks and ISDN Systems 30 (1998) 205-214.
Japanese Office Action, issued in Japanese Patent Application No. JP 2002-357412, dated on Jul. 13, 2007.

*Primary Examiner*—Andrew Caldwell
*Assistant Examiner*—Bradford F Fritz
(74) *Attorney, Agent, or Firm*—McDermott Will & Emery LLP

(57) ABSTRACT

To lower risks of overhead on management of an access log and of a loss of the access log due to a default and to prevent deterioration in service providing performance caused by access concentration to a specific Web server in an access relaying apparatus including a plurality of proxy servers. An access relaying apparatus has a plurality of proxy servers 23, an administration server 24 for statistic processing, and a shared disk 25 accessible from them. Each of the proxy servers outputs an access log to the shared disk, and the administration server reads the access logs from the shared disk and performs statistic processing. An access limit to a specific Web server is determined based on a result of the statistic processing, it is notified to each of the proxy servers, and a number of accesses to the Web server is controlled.

11 Claims, 10 Drawing Sheets

90: Web SERVER ACCESS LIMIT MANAGEMENT TABLE

| Web SERVER ADDRESS | PRESCRIBED VALUE FOR ACCESS LIMIT | AVERAGE REPLY TIME | ACCESS LIMIT |
|---|---|---|---|
| | | | |
| | | | |
| ⋮ | | | |
| | | | |
| 900 | 901 | 902 | 903 |

91: REQUEST URL ACCESS LIMIT MANAGEMENT TABLE

| REQUEST URL | PRESCRIBED VALUE FOR ACCESS LIMIT | AVERAGE REPLY TIME | ACCESS LIMIT |
|---|---|---|---|
| | | | |
| | | | |
| ⋮ | | | |
| | | | |
| 910 | 911 | 912 | 913 |

U.S. PATENT DOCUMENTS

| | | | |
|---|---|---|---|
| 7,047,309 B2* | 5/2006 | Baumann et al. | 709/232 |
| 7,111,061 B2* | 9/2006 | Leighton et al. | 709/224 |
| 2002/0052942 A1* | 5/2002 | Swildens et al. | 709/223 |
| 2002/0055980 A1 | 5/2002 | Goddard | |
| 2003/0046398 A1* | 3/2003 | Buckley et al. | 709/227 |
| 2005/0102427 A1* | 5/2005 | Yokota et al. | 709/245 |
| 2002/0042828 A1* | 4/2002 | Peiffer | 709/227 |

* cited by examiner

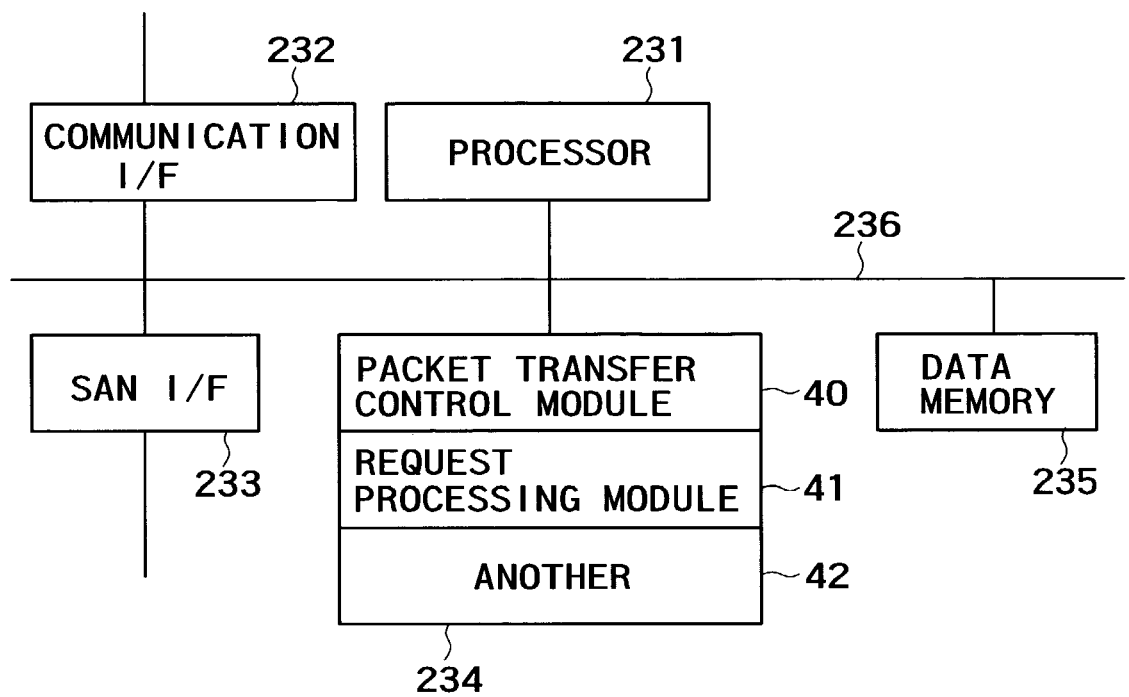
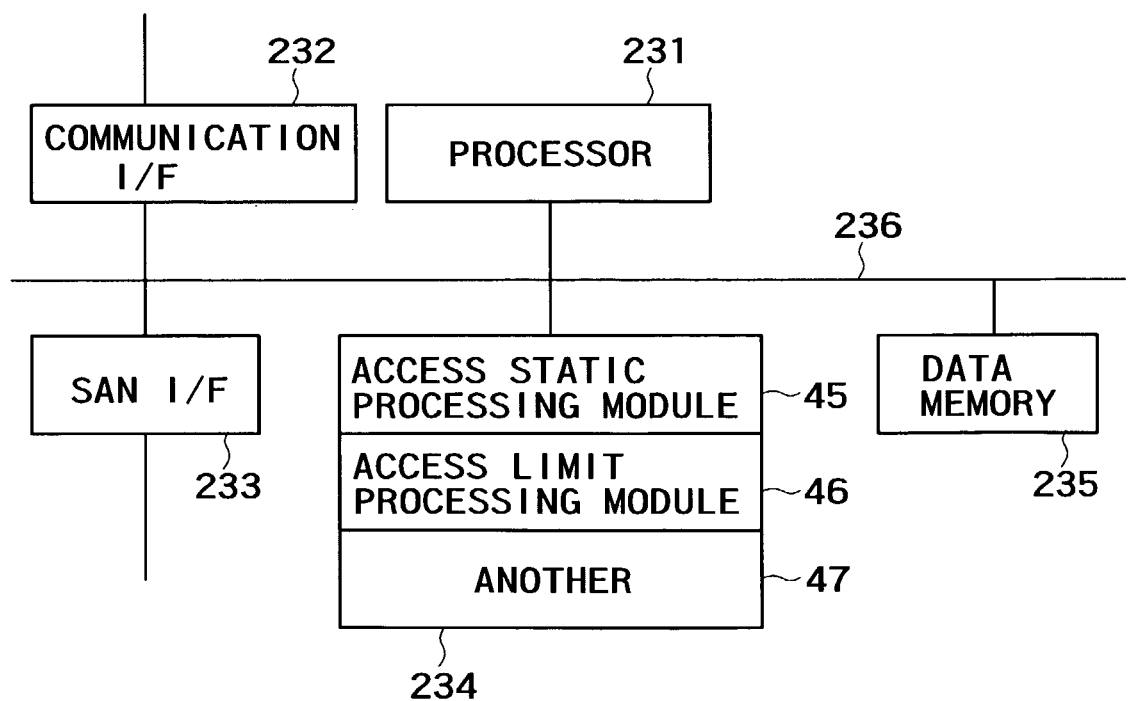

FIG. 5

61-k: RECORD OF ACCESS LOG

| | |
|---|---|
| PROXY SERVER No. | ~610 |
| SESSION No. | ~611 |
| HTTP REPLY CODE | ~612 |
| ERROR No. | ~613 |
| CLIENT ADDRESS | ~614 |
| REQUEST TRANSFER DESTINATION (Web SERVER) ADDRESS | ~615 |
| REQUEST URL | ~616 |
| CLIENT INFORMATION | ~617 |
| REQUEST RECEPTION TIME | ~618 |
| REPLY MESSAGE TRANSMISSION COMPLETION TIME | ~619 |
| PROXY SERVER PROCESSING TIME | ~620 |
| Web SERVER REPLY WAITING TIME | ~621 |
| REQUEST HEADER SIZE FROM CLIENT | ~622 |
| REPLY HEADER SIZE TO CLIENT | ~623 |
| REQUEST DATA SIZE FROM CLIENT | ~624 |
| REPLY DATA SIZE TO CLIENT | ~625 |
| REQUEST HEADER SIZE TO Web SERVER | ~626 |
| REPLY HEADER SIZE FROM Web SERVER | ~627 |
| REQUEST DATA SIZE TO Web SERVER | ~628 |
| REPLY DATA SIZE FROM Web SERVER | ~629 |
| CACHE FLAG | ~630 |

F I G. 7

70: STATIC DATA TABLE

| REQUEST URL | TOTAL OF ACCESSES | TOTAL OF REPLY TIME | AVERAGE REPLY TIME | TOTAL DATA SIZE OF REQUEST | AVERAGE DATA SIZE OF REQUEST | TOTAL DATA SIZE OF REPLY MESSAGE | AVERAGE DATA SIZE OF REPLY MESSAGE |
|---|---|---|---|---|---|---|---|
| | | | | | | | |
| | | | | | | | |
| --- | | | | | | | |
| 700 | 701 | 702 | 703 | 704 | 705 | 706 | 707 |

71: ACCESS LOG FILE TABLE

| ACCESS LOG FILE NAME | NUMBER OF READ ACCESS LOGS |
|---|---|
| | |
| --- | --- |
| 710 | 711 |

NUMBER OF ENTRIES

FIG.9

80: Web SERVER ACCESS MANAGEMENT TABLE

| Web SERVER ADDRESS | NUMBER OF ACCESSES | ACCESS LIMIT |
|---|---|---|
|  |  |  |
|  |  |  |
| ⋮ |  |  |
|  |  |  |
| 800 | 801 | 802 |

81: REQUEST URL ACCESS MANAGEMENT TABLE

| REQUEST URL | NUMBER OF ACCESSES | ACCESS LIMIT |
|---|---|---|
|  |  |  |
|  |  |  |
| ⋮ |  |  |
|  |  |  |
| 810 | 811 | 812 |

FIG.10

90:Web SERVER ACCESS LIMIT MANAGEMENT TABLE

| Web SERVER ADDRESS | PRESCRIBED VALUE FOR ACCESS LIMIT | AVERAGE REPLY TIME | ACCESS LIMIT |
|---|---|---|---|
| | | | |
| | | | |
| ⋮ | | | |
| | | | |
| 900 | 901 | 902 | 903 |

91:REQUEST URL ACCESS LIMIT MANAGEMENT TABLE

| REQUEST URL | PRESCRIBED VALUE FOR ACCESS LIMIT | AVERAGE REPLY TIME | ACCESS LIMIT |
|---|---|---|---|
| | | | |
| | | | |
| ⋮ | | | |
| | | | |
| 910 | 911 | 912 | 913 |

ACCESS RELAYING APPARATUS

INCORPORATION BY REFERENCE

This application claims priority based on a Japanese patent application, No. 2002-357412 filed on Dec. 10, 2002, the entire contents of which are incorporated herein by reference.

BACKGROUND OF THE INVENTION

The present invention relates to an access relaying apparatus, and more particularly, to a management method of an access log which is outputted from an access relaying apparatus.

The Internet has rapidly been spread, conventional business-counter services have been provided via the Internet, and services such as moving pictures, e.g., a movie have been provided. Further, the communication technology has advanced, thus to improve the environment under which the services are received to not only homes and offices but also mobile phones.

An access from a client to a service provider server (hereinafter, referred to as a Web server) via the Internet is generally performed via an access relaying apparatus which is a so-called proxy server of a provider for communication. Usually, the access relaying apparatus collects access logs for recording the contents of the accesses so as to research the number of accesses from the client to the Web server and preferences.

For example, U.S. Pat. No. 6,317,787 discloses a technology for collecting the access logs under an environment including a plurality of service provider servers.

The single proxy server for communication cannot process the accesses because it normally relays the communication between many users and the Web server. A method for solving the overflow is well known, and by using the method, for example, a single access relaying apparatus includes a plurality of proxy servers connected to a load balancer to load-balance access requests from users to the plurality of proxy servers.

In the conventional load balancing type access relaying apparatus disclosed in the non-patent document 1, the servers output the access logs onto local disks thereof. Therefore, upon back-up of the access logs and statistic processing of the accesses using the access logs, each access log needs to be collected from the proxy servers and the overhead is increased. Thus, the access log is not effectively used.

There is a problem that the access log is lost when a default is caused in the local disk for storing the access log.

Further, no link function generally exists between the proxy servers and the server which performs the statistic processing, and an obtained result of the statistic processing is not advantageously used.

Accordingly, the improvement of a management method and a using method of the access log is desired.

SUMMARY OF THE INVENTION

The present invention provides, in an access relaying apparatus including a plurality of proxy servers, a technology for reducing the overhead of an access log on the management and a technology for preventing the reduction in service providing performance due to access concentration to a Web server by using information obtained from statistic processing of the access log for the access control of the proxy servers.

According to the present invention, an access relaying apparatus includes a shared disk device in which each of the plurality of proxy servers outputs the access log. Therefore, the back-up of the shared disk device enables both the back-up of the access logs which are outputted by all the proxy servers and the reduction of the back-up overhead.

Further, the access relaying apparatus includes an administration server which manages a proxy cluster having a plurality of proxy servers which share the disk apparatus. The administration server performs statistic processing of the access logs. The administration server can read the access logs of the proxy servers on the shared disk device and thus the overhead for transferring the access logs from the proxy servers is prevented.

Furthermore, the administration server determines an access limit to a Web server based on a reply time of the Web server, which is obtained from the statistic processing, and sends a notification indicating the access limit to the proxy servers. The proxy servers control the number of accesses per unit time in accordance with the access limit which is notified, thereby preventing the reduction in service providing performance due to the access concentration to the Web server.

In addition, as mentioned above, since the overhead for transferring the access log is small, the statistic processing and the feed-back of the processing result are frequently executed. Consequently, the access control is properly performed.

According to the present invention, improved methods for managing and using the access log are provided.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 2 illustrates a diagram showing the structure of the proxy server 23-$n$ forming the access relaying apparatus 2.

FIG. 3 illustrates a diagram showing the structure of the administration server 24 forming the access relaying apparatus 2.

FIG. 5 illustrates a diagram showing one example of the data structure of the records of the access logs 61-1 to 60-K as entities of the access log.

FIG. 7 illustrates a diagram showing an example of the data structure of the statistic data table 70 and the access log file table 71.

FIG. 9 illustrates a diagram showing an example of the data structure of the 23-$n$ Web server access management table 80 and the request URL access management table 81.

FIG. 10 illustrates a diagram showing an example of the data structure of the Web server access limit management table 90 and the request URL access limit management table 91.

DETAILED DESCRIPTION OF THE PREFERRED EMBODIMENTS

Herein below, an embodiment of the present invention will be described with reference to the drawings.

Figure 1:
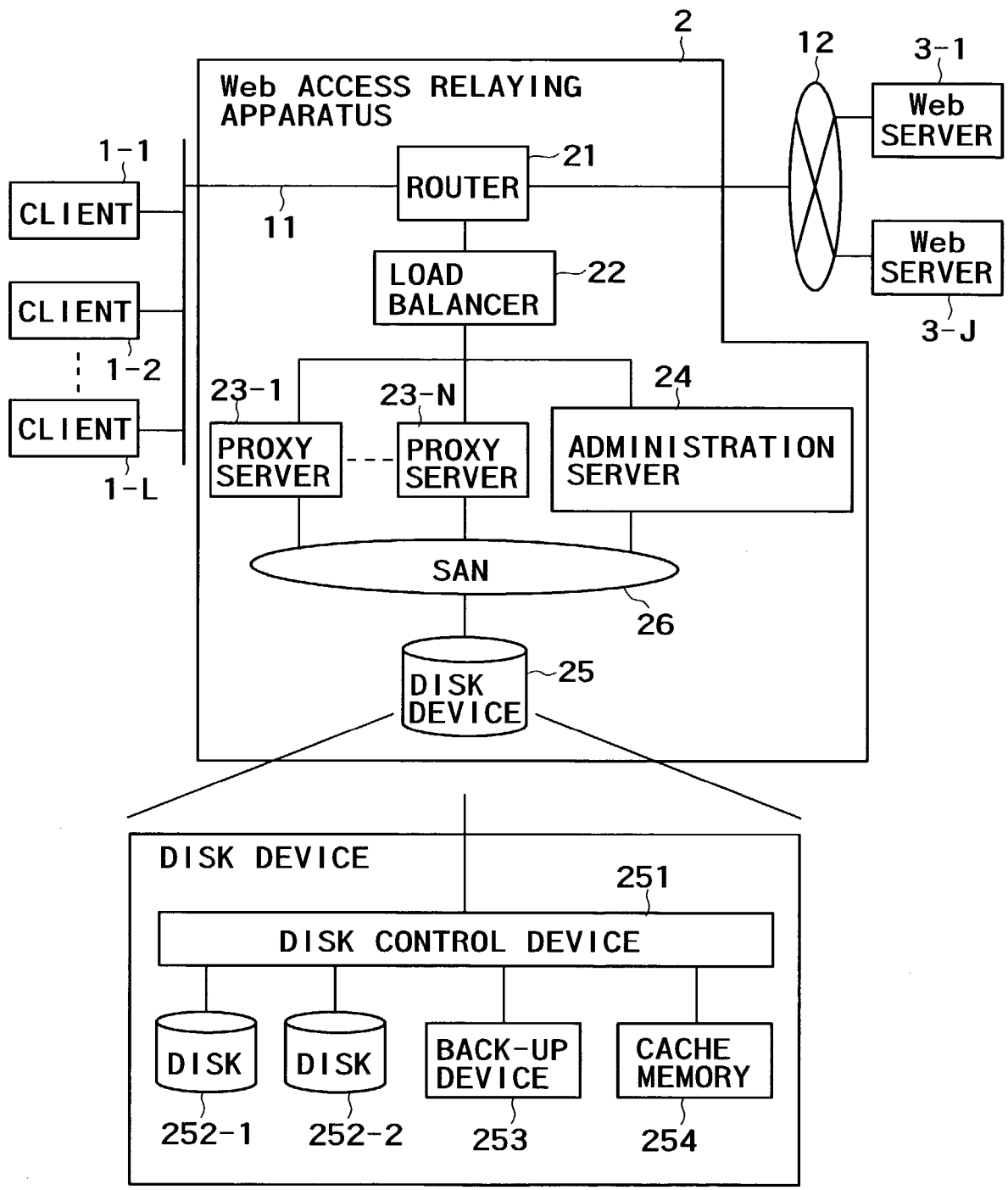
FIG. 1 illustrates a diagram showing the structure of a communication network system including the access relaying apparatus 2 according to the embodiment.

FIG. 1 shows the structure of a communication network system including an access relaying apparatus 2 according to the embodiment.

The access relaying apparatus 2 is connected to a plurality of client devices 1 (1-1 to 1-L) via a communication network 11 such as a LAN or the Internet, and is further connected to a Web server 3 (3-1 to 3-J) via a network (hereinafter referred to as the Internet) 12 such as the Internet.

The access relaying apparatus 2 includes a router 21 which is connected to the communication network 11 and the Internet 12, a load balancer 22 which is connected to the router 21, a plurality of proxy servers 23-*n* ($1 \leq n \leq N$) which are connected to the load balancer 22, an administration server 24 having a communication function, with the plurality of proxy servers 23, a shared disk device 25 which stores access logs outputted by the plurality of proxy servers 23, and an SAN (Storage Area Network, that is, fast disk communication network) 26 which connects the proxy servers 23, the administration server 24, and the disk device 25. The disk device 25 stores statistic data formed by the administration server 24. The details of the shared disk device 25 will be described later.

The request for obtaining the contents sent from the client 1 is received by the router 21 and then is transferred to the load balancer 22. The load balancer 22 sequentially load-balances the request for obtaining the contents received from the router 21 to the proxy servers 23-*n* in accordance with a predetermined load balancing algorithm.

If the contents whose acquisition is requested from the client 1 are included in (are hit to) the cache memory on the proxy server 23-*n*, the proxy server 23-*n* sends the cached contents to the client 1. If the contents are not included in (are not hit to) the cache memory, the proxy server 23-*n* transmits the received request for obtaining the contents to an arbitrary Web server 3-J for providing the contents. The Web server 3-J forms a reply message including the requested contents, and sends the formed reply message to the proxy server 23-*n* which transmits the request for obtaining the contents. The proxy server 23-*n* which receives the reply message transmits the received reply message to the client 1 as the transmission source of the request for obtaining the contents. The proxy server 23-*n* transmits the contents to the client 1 as the transmission source of the request for obtaining the contents when it can send the contents internally or externally stored in the cache memory as a reply to the received request for obtaining the contents.

After that, the proxy server 23-*n* outputs the access log as a communication record to the disk device 25.

Herein below, a description is given of the flow of the request when the number of requests for obtaining the contents (1-1 to 1-L) which do not correspond to the contents in the cache memory is over the access limit to the Web server 3 per unit time.

The proxy server 23-*n* receives the request for obtaining the contents sent from the client 1 via the router 21 and the load balancer 22. If the number of processed requests for obtaining the contents is over the access limit, the proxy server 23-*n* forms an error message in response to the received request for obtaining the contents and transmits the formed error message to the client 1 as the transmission source of the request for obtaining the contents (the proxy server 23-*n* does not transmit the request for obtaining the contents to the Web server 3-J).

FIG. 2 is a diagram showing the structure of the proxy server 23-*n*.

The proxy server 23-*n* includes a processor 231, a communication interface 232 for connection to the load balancer 22 and the administration server 24, a disk input/output interface 233 for connection to the disk device 25, and a memory 234 for program storage, and a memory 235 for data storage. These components are mutually connected via an internal communication line (hereinafter, referred to as a bus) 236. The memory 234 stores, as control software executed by the processor 231, a packet transfer control module 40 for controlling the reception and transmission of a packet (message) transmitted to another device via the communication interface 232, a request processing module 41, and another control module 42.

FIG. 3 is a diagram showing the structure of the administration server 24.

The administration server 24 can be structured similarly to the proxy server 23-*n*. The communication interface 232 is used for connection to the load balancer 22 and the proxy server 23-*n*. The memory 234 stores, as control software executed by the processor 231, an access statistic processing module 45 for reading the access log stored in the disk device 25 and for statistic processing, an access limit processing module 46 for determining the access limit to the Web server 3-*j* based on the statistic processing result, and another control module 47.

Figure 4:
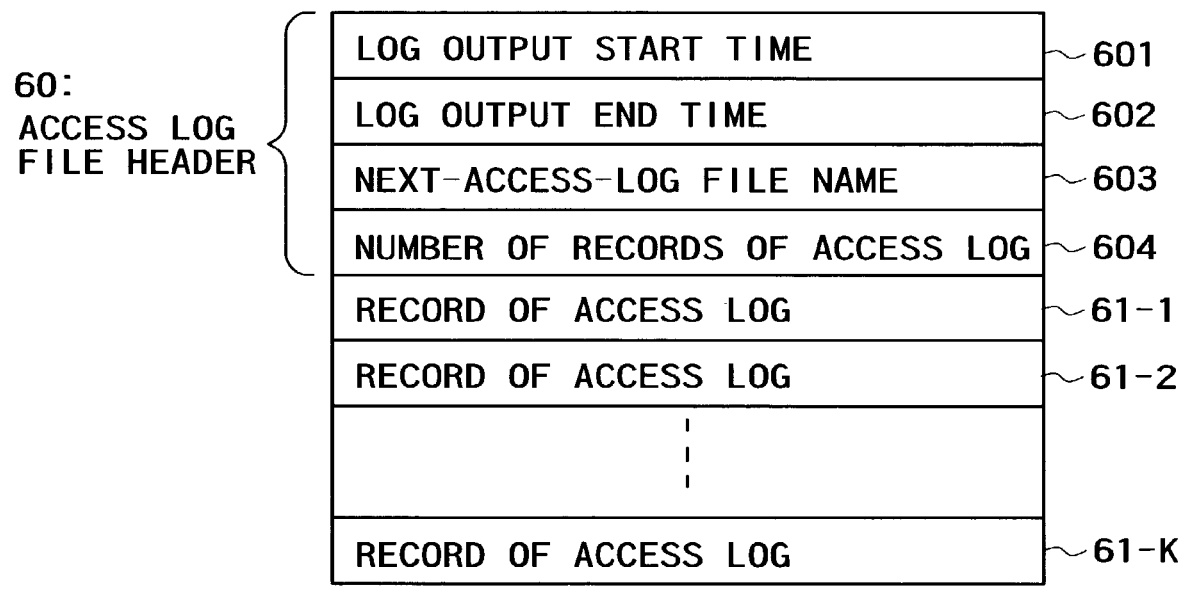
FIG. 4 illustrates a diagram showing the data structure of the access log file 50 stored in the disk device 25 according to the embodiment.

FIG. 4 is a diagram showing the data structure of a file for storing the access logs stored on the disk device 25 shared by the plurality of proxy servers.

An access log file 50 for storing the access logs includes an access log file header 60 for storing information on the access log file 50 and a record of the access log 61-*k* ($1 \leq k \leq K$) as an entity of the access log which is outputted from the proxy server 23.

The access log file header 60 includes a log output start time 601 indicating the date and time when the access log is first written, a log output end time 602 indicating the date and time when the access log is finally written, a next-access-log file name 603 indicating the changing destination when the proxy server changes the output destination of the access log to another file, and a number of records of the access log 604 indicating the number of the access logs stored in the file.

The single access log file 50 is assigned to each proxy server. Therefore, N access log files 50-*n* ($1 \leq n \leq N$) for the proxy server 23-*n* exist on the disk device 25.

FIG. 5 is a diagram showing a data format of the single record of the access log 61-*k* formed every session unit as the entity of the access log.

The record of the access log 61-*k* includes: a proxy server number 610 for specifying the proxy server which outputs the record; a session number 611 as a reception number of the request for obtaining the contents received by the proxy server; an HTTP reply code 612 indicating an error status added to the reply message from the Web server; an error number 613 indicating an error code for the reply of the proxy server 23 to the client 1; a client address 614 for specifying the transmission source of the received request for obtaining the contents; a request transfer destination (Web server) address 615 indicating the transmission destination of the request for obtaining the contents; a request URL 616 indicating the destination for obtaining the contents described in the request for obtaining the contents; client information 617 indicating information on the client 1 which transmits the request for obtaining the contents; a request reception time 618 indicating the reception time of the request for obtaining the contents from the client 1 by the proxy server 23-*n*; a reply message transmission completion time 619 indicating the end time for transmitting the reply message to the client 1 by the proxy server 23-*n*; a proxy server processing time 620 indicating the time required by the processing in the proxy server 23-*n*; a Web server reply waiting time 621 indicating a waiting time from the transmission of the request for obtaining the contents to the Web server 3-*j* to the reception of the reply message from the Web server 3-*j*; a header size 622 of the request for obtaining the contents received from the client 1; a header size 623 of the reply message to the client 1; a data size 624 of the request for obtaining the contents received from the client 1; a data size 625 of the reply message to the client 1; a header size 626 of the request for obtaining the contents transmitted to the Web server 3-*j*; a header size 627 of the reply message received from the Web server 3-*j*; a data size 628 of the request for obtaining the contents transmitted to the Web server 3-*j*; a data size 629 of the reply message received from the Web server 3-*j*; and a cache flag 630 indicating whether or not the cache is used.

According to the embodiment, the session means one-time reception and transmission from the issue of any desired request on the access source (access relaying apparatus according to the embodiment) to the reply to the request on the access destination (service provider server according to the embodiment).

Figure 6:
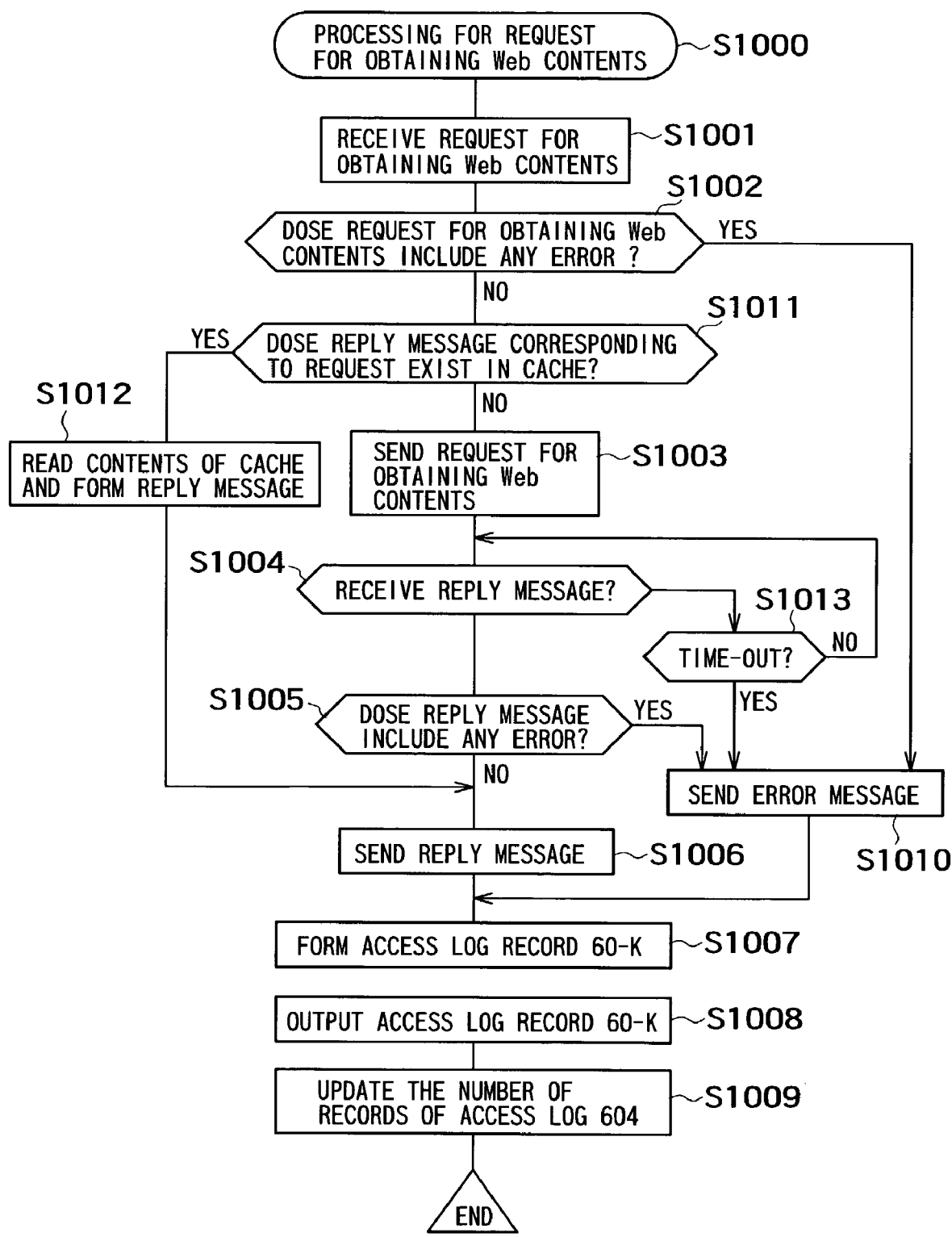
FIG. 6 illustrates a flowchart showing the processing for obtaining the contents of the proxy server 23-$n$ according to the embodiment.

FIG. 6 is a flowchart of processing for the request for obtaining the contents of the proxy server 23-*n*.

The proxy server 23-*n* receives the request for obtaining the contents from the client 1 (S1001) and then it is checked whether or not the request for obtaining the contents includes an error (S1002). If the request for obtaining the contents includes the error, an error message is sent to the client 1 (S1010). If the request for obtaining the contents does not include the error, it is checked whether or not the reply message corresponding to the request exists in the cache on the proxy server 23-*n* (S1011). If the reply message exists in the cache (is hit to the cache), the reply message is read and the reply message is formed (S1012) and the formed reply message is sent to the client 1. If the reply message does not exist in the cache, the request for obtaining the contents from the client is sent to the Web server 3-*j* which provides the contents (S1003). Then, the return of the reply message from the Web server 3-*j* is waited (S1004). If the reply message is not returned from the Web server 3-*j* and the time is out (S1013), the error message is transmitted to the client 1 (S1010). The reply message is received from the Web server 3-*j* (1004), it is checked whether or not the reply message includes any error (S1005). If the reply message includes an error, the error message is sent to the client 1 (S1010). If the reply message does not include any error, it is sent to the client 1 (S1006). In both the case of normally returning the reply message to the client and the case of returning the error message, the proxy server 23-*n* forms the access log record shown in FIG. 5 in accordance with the processing result (S1007). Further, the proxy server 23-*n* outputs the access log record to the access log file 50 in the disk device 25 (S1008). The number of records of the access log 604 in the access log file header 60 is updated (S1009).

Referring to FIG. 1, the disk device 25 as the output destination of the access log may include two disks 252-1 and 252-2, a disk control device 251, a back-up device 253, and a cache memory 254. When the data is externally inputted, the disk control device 251 having the structure shown in FIG. 1 writes the same data to the disks 252-1 and 252-2 and the cache memory. With abovementioned structure of the disk device 25, if any default is caused in the single disk, the loss of access log is prevented because the data having the same contents is stored in the other disk. The disk device 251 may have the structure other than that shown in FIG. 1.

As mentioned above, the proxy server 23-*n* stores the access logs collected by the proxy server 23-*n* in the disk device 25 and thus the loss of the access log due to the default of the proxy server 23-*n* is prevented and the back-up and collection are easy. The proxy server 23-*n* is reduced in size without providing the disk for the proxy server 23-*n*. Consequently, the access relaying apparatus 2 is structured with a saved space.

Next, a description is given of processing of the administration server 24.

FIG. 7 shows an example of the structure of a table generated by the administration server 24.

A statistic data table 70 stores statistic data obtained from the access log. The statistic data table 70 includes a request URL 700 indicating the destination of the request for obtaining the contents transmitted by the clients 1-1 to 1-L, a total of accesses 701 to the request URL, a total of a reply time 702 from the Web server 3-*j* upon access to the request URL, an average reply time 703, a total data size of the request 704 transmitted to the request URL, an average data size of the request 705, a total data size of the reply message 706 of the reply message from the Web server 3-*j*, and an average data size of the reply message 707.

The statistic data table 70 is stored onto the disk device 25.

The access log file table 71 includes N entries indicating the access log file 50-*n*. Each entry includes an access log file name 710 as a reference target, and a number of read access logs 711 indicating the number of access logs which have already been processed by the administration server 24.

According to a method for setting the access log file name entering the access log file table 71, an initial setting file name may previously be recorded to an initial setting file of the administration server 24, and the contents of the initial setting file may be read and the access log file name may be set upon initializing the administration server 24. Alternatively, a method for sending a notification to the administration server 24 by the proxy server 23-*n* may be used.

Figure 8:
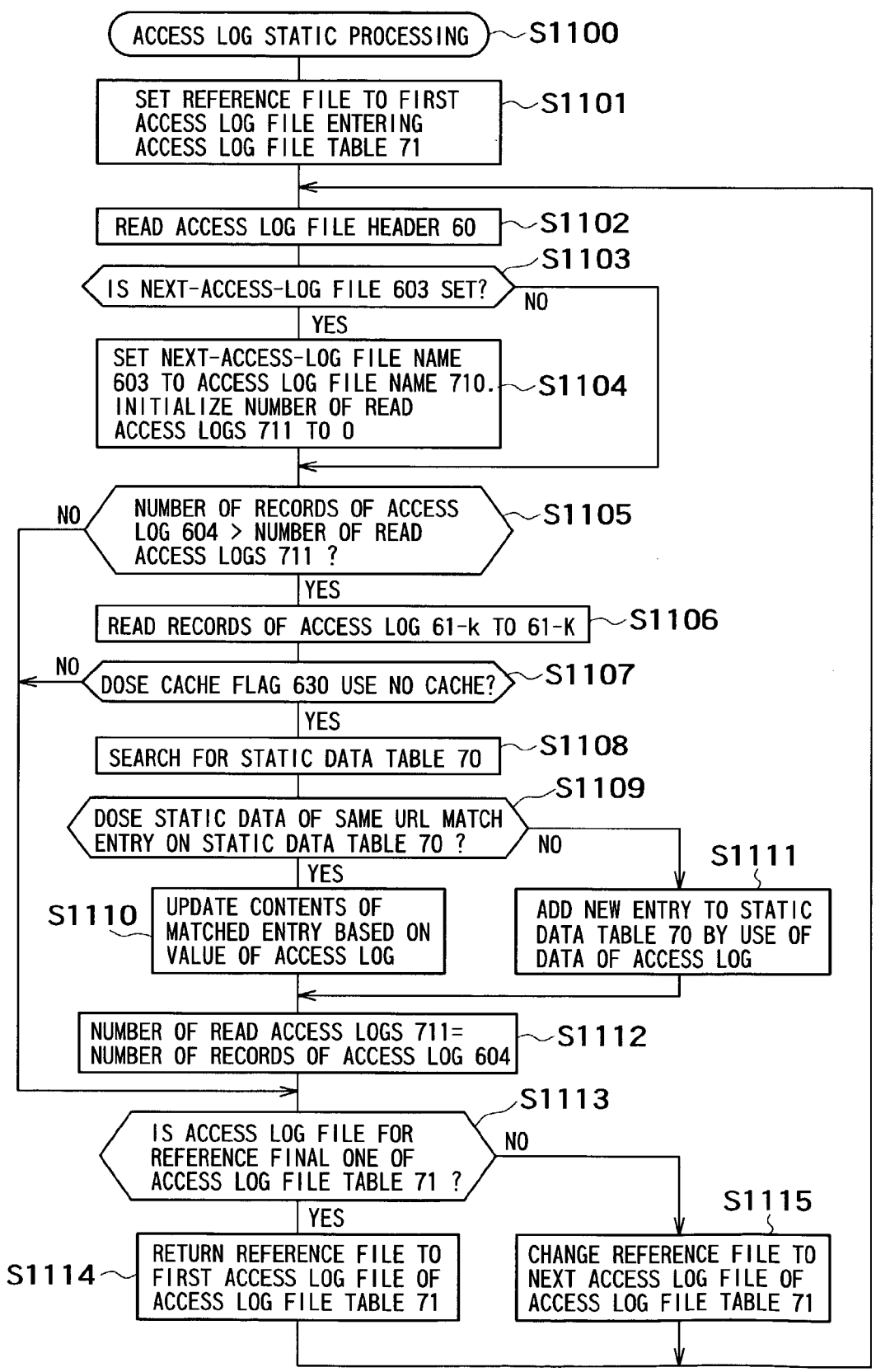
FIG. 8 illustrates a flowchart showing the access log statistic processing performed by the administration server 24 according to the embodiment.

FIG. 8 is a flowchart showing the outline of the statistic processing of the administration server 24.

First, the administration server 24 sets the access log file name 710 first entering the access log file table 71 as a reference access log file name (S1101). Next, the administration server 24 reads the access log file header 60 of the reference access log file 50 on the disk device 25 (S1102). The administration server 24 checks whether or not the next access log file 603 is set (S1103). When the next access log file 603 is set, the access log file name 710 is replaced with the file name of the entry which is currently referred to on the access log file table 71, and the number of the read access logs 711 is initialized to zero (S1104). The reference access log file is changed by the operations in steps S1102 to S1104.

Subsequently, the number of records of the access log 604 in the read access log file header 60 is compared with the number of the read access logs 711 in the access log file table 71 (S1105). When both the values are matched, all K log files included in the reference access log file are processed. Then, the processing routine shifts to processing for changing the reference access log file (S1113). When the number of records of the access log 604 is larger than the number of the read access logs 711, the records of the access log 61-*k* to 61-K which are not read from the access log file 50 subsequently to the number of the read access logs and, for example, the read records of the access log are stored in the data memory 235 (S1106).

The administration server 24 checks cache flags 630 of all the read records of the access log. If the cache flags 630 indicate that the contents of the records do not use the cache (S1107), the records of the access log in this case are subjected to the processing in steps S1108 to S1112.

The administration server 24 searches for the entries in the statistic data table 70 by use of the request URL 616 of the record of the access log 61-*k* as a search key (S1108). When the request URLs 616 in the record of the access log 61-*k* partly match the request URL 700 in the statistic data table 70 (ranging a head character of the URL to a prescribed portion) or when all the request URLs 616 match it (S1109), the contents of the matched entry in the statistic data table 70 are changed based on the contents of the record of the access log 61-*k* (S1110). An optical setting is possible upon starting the system when the prescribed range is set or when the matching is checked by the method using the part or the method using all the request URLs. The result may be stored in the data memory 235.

Specifically, the total of accesses 701 is incremented by 1 and a value obtained by subtracting the request reception time 618 from the reply message transmission completion time 619 is added to the total reply time 702. A value obtained by dividing the changed total reply time 702 by the changed total of accesses 701 is set to the average reply time 703. The header size of the request 626 to the Web server and the data size of the request 628 to the Web server are added to the total data size of the request 704. Further, a value obtained by dividing the changed total data size of the request 704 by the total of accesses 701 is set to the average data size of the request 705. The header size of the reply 623 to the client and the data size of the reply 625 to the client are added to the total data size of the reply message 706. A value obtained by dividing the changed total data size of the reply message 706 by the total of accesses 701 is set to the average data size of the reply message 707.

The data size is not directly used for the access control according to the embodiment. However, an operator of the administration server 24 monitors a traffic to the service server and, for example, the data size can be used as the measure of equipment enhance.

When the matched entry is not found in step S1109, a new entry as the contents of the record of the access log 61-*k* is added to the statistic data table 70 (S1111). Specifically, the request URL 616 is set to the request URL 700, one is set to the total of accesses, a value obtained by subtracting the request reception time 618 from the reply message transmission completion time 619 is set to the total reply time 702. A value obtained by dividing the changed total reply time 702 by the changed total of accesses 701 is set to the average reply time 703. An addition value of the header size of the request 626 to the Web server and the data size of the request 628 to the Web server is set to the total data size of the request 704. A value obtained by dividing the changed total data size of the request 704 by the total of accesses 701 is set to the average data size of the request 705. An addition value of the header size of the reply 623 to the client and the data size of the reply 625 to the client is set to the total data size of the reply message 706. A value obtained by dividing the changed total data size of the reply message 706 by the total of accesses 701 is set to the average data size of the reply message 707.

After the processing in steps S1110 and S1111, the value of the read access log 711 is replaced with the value of records of the access log 604 (S1112).

Next, the administration server 24 changes the reference access log file.

When the access log file which is currently referred to is the final file which enters the access log file table 71 (S1113), the administration server 24 returns the reference access log file to the access log file which first enters the access log file table 71 (S1114). If not so, the administration server 24 changes the reference access log file to the access log file described in the next entry which is currently referred to in the access log file table 71 (S1115).

After that, the administration server 24 returns to processing for reading the access log file header 60 (S1102) whereupon the abovementioned processing is repeated.

Processing based on the collection result in the above steps will be described later.

According to the embodiment, the proxy server 23-*n* does not need to respond to the access log read from the administration server 24 and therefore a processing load is reduced. Further, the administration server 24 does not give the proxy server 23-*n* the processing load. Therefore, the above operation can be repeated periodically at a short interval (for example, a second-order interval). Thus, since the statistic processing of the accesses relayed by the access relaying apparatus 2 can frequently be performed, the feed-back of the statistic processing result becomes effective.

Further, since the administration server 24 refers to the access log for a short time after the proxy server 23-*n* writes the access log, a cache hit ratio of the access log written to the cache memory in the disk device 251 is high and the administration server 24 can read the access log for a short time. Further, back-up data of all the access logs is collected by collecting back up data of the disk 252-1 or 252-2 by the back-up device 253.

The cooperation of the proxy server 23-*n* and the administration server 24 enables the limitation to the access to the Web server 3-J from the clients 1-1 to 1-L. Herein below, a function thereof will be described.

FIG. 9 is a diagram showing the data structure of the access management table included in the proxy server 23-*n*. As will be understood with reference to FIG. 9, the number of accesses to the Web server 3-J enables both the limitation to the access to the Web server and the limitation to the access at the request URL.

The Web server access management table 80 includes a Web server address 800 indicating the transmission destination Web server of the request for obtaining the contents from the clients 1-1 to 1-L, a number of accesses 801 indicating the number of requests for obtaining the contents which are currently transmitted to the Web server, and an access limit 802 per unit time indicating an upper limit of transmissions of the requests for obtaining the contents which are simultaneously transmitted to the Web server.

The request URL access management table 81 includes a request URL 810 indicating a transmission destination URL of the request for obtaining the contents from the clients 1-1 to 1-L, a number of accesses 811 indicating the number of requests for obtaining the contents which are currently transmitted to the request URL, and an access limit 812 per unit time indicating an upper limit of transmissions of the requests for obtaining the contents which are simultaneously transmitted to the request URL.

FIG. 10 is a diagram showing the data structure of an access limit number management table included in the administration server 24. Similarly to the proxy server 23-*n*, both an access limit number management table to the Web server and an access limit number management table to the request URL exist.

A Web server access limit management table 90 includes a Web server address 900 indicating the Web server as the transmission destination of the request for obtaining the contents from the clients 1-1 to 1-L, an access limit prescribed value 901 as a reference for access limit, an average reply time 902 upon transmitting the request for obtaining the contents to the Web server obtained from the statistic data table 70 shown in FIG. 7, and an access limit 903 per unit time indicating an upper limit of transmissions of the requests for obtaining the contents which are simultaneously transmitted to the Web server.

A request URL access limit management table 91 includes a request URL 910 indicating a transmission destination URL of the request for obtaining the contents from the clients 1-1 to 1-L, an access limit prescribed value 911 as a reference for the access limit, an average reply time 912 upon transmitting the request for obtaining the contents to the request URL obtained from the statistic data table 70 shown in FIG. 7, and an access limit 913 per unit time indicating an upper limit of transmissions of the requests for obtaining the contents which are simultaneously transmitted to the request URL.

The two types of tables enable the access limit for all the requests to a specific Web server and access limit for a specific URL (namely, service).

Figure 11:
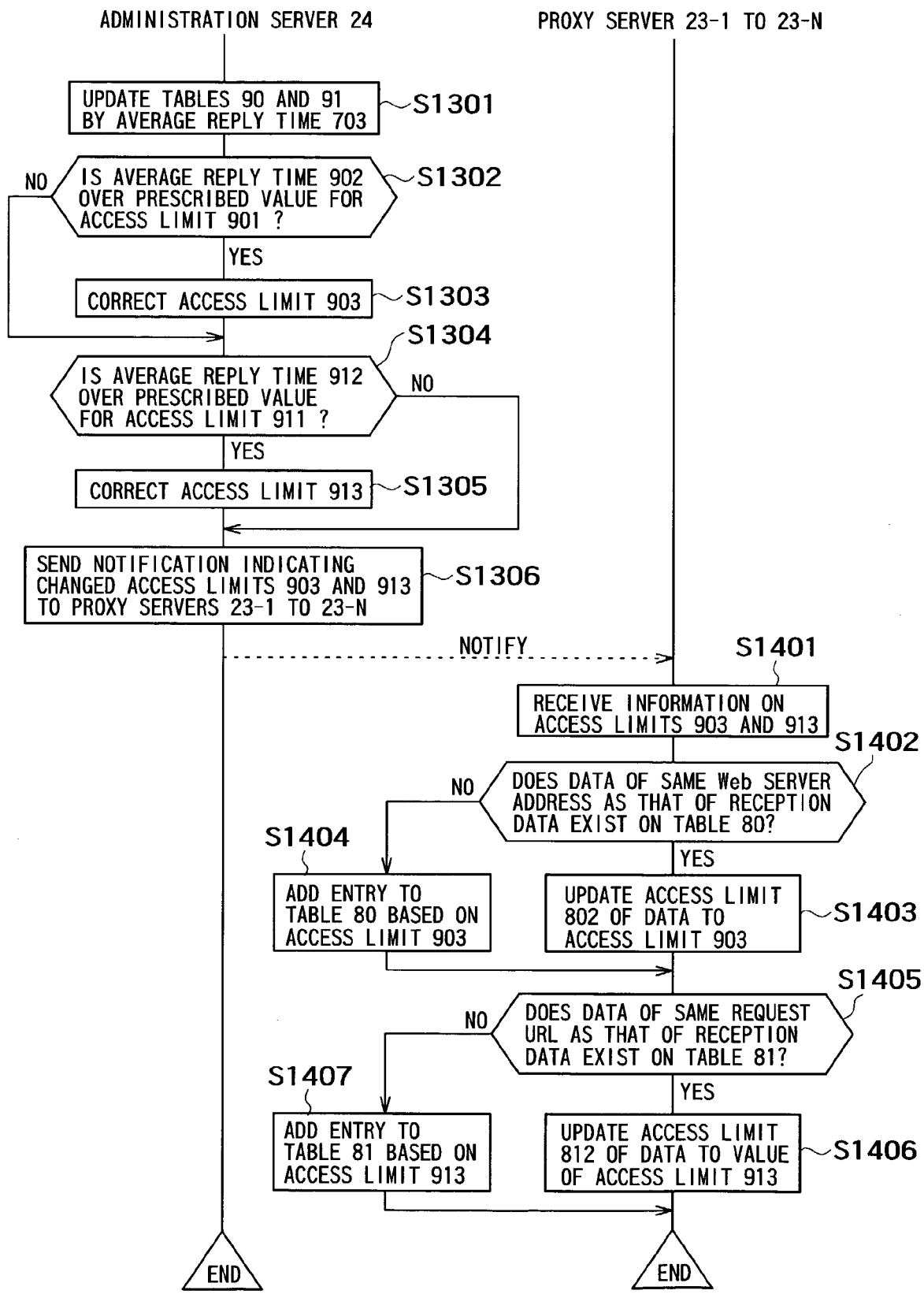
FIG. 11 illustrates a flowchart of the processing for updating the, access limit 902 and 912 in the administration server 24 and for updating the access limit 802 in the 23-*n* Web server access management table 80 and the access limit 812 in the request URL access management table 81 according to the embodiment.

FIG. 11 is a flowchart indicating a method for updating the access limit between the administration server 24 and the proxy server 23-*n*. The processing flow may start upon updating the statistic data table 70.

Upon updating the statistic data table as the result of the access log statistic processing S1100 in step S1109 or S1110 as shown in FIG. 8, the administration server 24 sets a value of the average reply time 703 in the statistic data table 70 to the average reply time 902 in the Web server access limit management table 90 and the average reply time 912 in the request URL access limit management table 91 (S1301). Thereafter, the average reply time 902 in the Web server access limit management table 90 is compared with the access limit prescribed value 901 (S1302). If the average reply time 902 is over the prescribed value, the access limit 903 is reduced by the prescribed value (approximately 1 to 10, determined by a communication scale of the access relaying apparatus 2), and the access limit 903 is updated (S1303). The average reply time 912 in the request URL access limit management table 91 is compared with the access limit prescribed value 911 (S1304). If the average reply time 912 is over the prescribed value, the access limit 913 is decreased by the prescribed value and the access limit 913 is updated (S1305). Information on the finally changed combination of the Web server address 900 and the access limit 903 and information on the combination of the request URL 910 and the access limit 913 are notified to the proxy server 23-*n* (S1306). The notification may be sent via the SAN 26 or via the network connecting the load balancer 22 and the proxy server 23-*n*.

The proxy server 23-*n* receives the information on the access limit 903 and 913 from the administration server 24 (S1401). Then, the proxy server 23-*n* checks whether or not a target entry of the access limit 903 exists in the Web server access management table 80 (S1402). If YES in step S1402, the access limit 802 of the entry is replaced to the notified access limit 903 (S1403). If NO in step S1402, the new entry is added to the Web server access management table 80 by use of the notified Web server address 900 and access limit 903 (S1404). Further, the proxy server 23-*n* checks whether or not the target entry of the access limit 913 exists in the request URL access management table 81 (S1405). If YES in step S1405, the access limit 812 of the entry is replaced to the notified access limit 913 (S1406). If NO in step S1405, the new entry is added to the request URL access management table 81 by use of the notified request URL 910 and the access limit 913 (S1407).

In the processing for obtaining the contents in parallel with the above processing, if the number of requests for obtaining the contents is over the access limit, the proxy server 23-*n* forms an error message to the received request for obtaining the contents and sends it to the client 1 as the transmission source of the request for obtaining the contents.

As mentioned above, the proxy server 23-*n* reflects the entire access statuses via the access relaying apparatus 2 to the access limit to the Web server in cooperation with the administration server 24 for a short time.

Further, the statistic processing in which the plurality of proxy servers 23-*n* sum up the access statuses enables accurate access control.

According to the embodiment, the access log as the communication record is stored in the shared disk device. Consequently, not only the loss of the access log due to the default of the proxy server is prevented but also the back-up of the access log is easy.

Upon the statistic processing with the access log by another server, the access log may be read from the shared disk device. Thus, the overhead of the collection of the access logs in the statistic processing is reduced.

The access status to the Web server which is obtained from the result of the statistic processing is reflected to the control for the access to the proxy server for a short time in cooperation with the proxy server and the server for the statisitc processing. Further, the Web server is protected from the deterioration in service quality due to the access concentration to the specific Web server.

In addition, since the transfer overhead of the access log to the disk device 25 from the proxy server 23-*n* is small, the statistic processing and the feed back of the result thereof are frequently performed. Thus, the access control can properly be performed.

The specification and drawings are, accordingly, to be regarded in an illustrative rather than a restrictive sense. It will, however, be evident that various modifications and changes may be made thereto without departing from the spirit and scope of the invention as set forth in the claims.

We claim:

1. An access relaying apparatus which accesses a service server in response to a request for obtaining contents received from a client and transmits the contents obtained from the service server to the client, the access relaying apparatus comprising:

a plurality of proxy servers that have a reply function to the request for obtaining the contents and generate access logs for the request;

a shared disk device which is connected to the plurality of proxy servers and stores the access logs output from each of the proxy servers therein;

first means for managing a first access limit per unit time indicating an upper limit of transmissions of requests for obtaining the contents which are transmitted to the service server as a destination of the requests;

second means for managing a second access limit per unit time indicating an upper limit of transmissions of requests for obtaining the contents which are transmitted to a URL in the service server as a destination of the requests; and an administration server which monitors operating statuses of the plurality of proxy servers, reads the access logs which are recorded to the shared disk device, (1) uses said access logs to calculate a first average reply time for receiving contents from the service server, reduces the first access limit if the first average reply time is over a first access limit prescribed value and updates the first access limit, and sends a notification indicating the updated first access limit to each of the plurality of proxy servers, and (2) uses said access logs to calculate a second average reply time for receiving contents from the URL, reduces the second access limit if the second average reply time is over a second access limit prescribed value and updates the second access limit, and sends a notification indicating the updated second access limit to each of the plurality of proxy servers, wherein each of the proxy servers limits a number of accesses to the destination of the request within the first and second access limits updatable from the administration server, wherein each of the plurality of proxy servers replies with an error message to the client when a number of client requests received by the proxy servers is over the first and second access limits.

2. An access relaying apparatus according to claim 1, wherein each of the plurality of proxy servers has a cache memory, and the administration server calculates the first and second average reply times by using said access logs when the proxy servers do not store the contents in response to an access request from the client into the cache memory and send the access request to said service server and said URL to obtain the contents.

3. An access relaying apparatus according to claim 1, wherein the administration server generates a table including a request URL indicating the destination of the request for obtaining the contents transmitted by clients, a total of accesses to the request URL, a total of a reply time from the service server upon access to the request URL, the second average reply time, a total data size of the request transmitted to the request URL, an average data size of the request, a total data size of the reply message of the reply message from the service server, and an average data size of the reply message which is obtained by execution of the statistic processing the access logs.

4. An access relaying apparatus according to claim 1, wherein the administration server determines the first access limit so that an average reply time of the service server is equal to a predetermined time or less.

5. An access relaying apparatus according to claim 1, wherein the administration server generates a management table including a request URL indicating the destination of the request, a total of accesses to the request URL, a total of a reply time from the service server upon access to the request URL and the second average reply time.

6. An access relaying apparatus according to claim 1, wherein said first means includes a Web server access limit management table that includes a Web server address indicating the Web server as the transmission destination of the request for obtaining the contents from the clients, the first access limit prescribed value as a reference for the first access limit, the first average reply time upon transmitting the request for obtaining the contents to the Web server, and the first access limit per unit time indicating an upper limit of transmissions of the requests for obtaining the contents which are simultaneously transmitted to the Web server.

7. An access relaying apparatus according to claim 1, wherein said second means includes a request URL access limit management table that includes the request URL indicating a transmission destination URL of the request for obtaining the contents from the clients, the second access limit prescribed value as a reference for the second access limit, the second average reply time upon transmitting the request for obtaining the contents to the request URL, and the second access limit per unit time indicating an upper limit of transmissions of the requests for obtaining the contents which are simultaneously transmitted to the request URL.

8. An access relaying apparatus according to claim 2, wherein the administration server manages a file name of the access log which is outputted from each of the plurality of proxy servers and a number of processed access logs in each of the access log files, and reads an unprocessed access log which is determined by the number of processed access logs from the recorded access log file and performs the statistic processing of the accesses.

9. An access relaying apparatus according to claim 4, wherein each of the plurality of proxy servers replies an error to the client when the client requests a number of accesses which is over the first and second access limits.

10. An access relaying apparatus according to claim 5, wherein said shared disk device stores said management table therein of which the second average reply time is updated by the processing of the administration server.

11. An access relaying apparatus according to claim 6, wherein said second means includes a request URL access limit management table that includes the request URL indicating a transmission destination URL of the request for obtaining the contents from the clients, the second access limit prescribed value as a reference for the second access limit, the second average reply time upon transmitting the request for obtaining the contents to the request URL, and the second access limit per unit time indicating an upper limit of transmissions of the requests for obtaining the contents which are simultaneously transmitted to the request URL.

* * * * *